(12) United States Patent
Zhu et al.

(10) Patent No.: US 10,218,752 B2
(45) Date of Patent: *Feb. 26, 2019

(54) MARKUP LANGUAGE FOR INCORPORATING SOCIAL NETWORKING SYSTEM INFORMATION BY AN EXTERNAL WEBSITE

(71) Applicant: Facebook, Inc., Menlo Park, CA (US)

(72) Inventors: Wei Zhu, Cupertino, CA (US); David Brookes Morin, San Francisco, CA (US); James M. Leszczenski, Sunnyvale, CA (US); Michael Steven Vernal, San Francisco, CA (US); Joshua E. Elman, Mountain View, CA (US); Luke Jonathan Shepard, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 1332 days.

This patent is subject to a terminal disclaimer.

(21) Appl. No.: 13/975,186

(22) Filed: Aug. 23, 2013

(65) Prior Publication Data

US 2013/0346502 A1    Dec. 26, 2013

Related U.S. Application Data

(63) Continuation of application No. 12/508,521, filed on Jul. 23, 2009, now Pat. No. 8,549,072.

(51) Int. Cl.
  *H04L 29/06* (2006.01)
  *G06Q 10/10* (2012.01)

(52) U.S. Cl.
  CPC .......... *H04L 65/403* (2013.01); *G06Q 10/10* (2013.01)

(58) Field of Classification Search
  None
  See application file for complete search history.

(56) References Cited

U.S. PATENT DOCUMENTS 6,128,655 A    10/2000    Fields et al.
6,167,441 A    12/2000    Himmel
(Continued)

OTHER PUBLICATIONS

Degenhart, C. et al., "AOL in a Nutshell: A Desktop Guide to America Online," Jun. 1998, Chapter 3, pp. 22-43; Chapter 9, pp. 129-148; Chapter 10, pp. 149-184.
(Continued)

*Primary Examiner* — Jeffrey R Swearingen
(74) *Attorney, Agent, or Firm* — Fenwick & West LLP

(57) ABSTRACT

A social networking system contains information describing information about users of the social networking system and about various connections among the users. When a user of the social networking system accesses an external website, the external website may send the user a web page containing markup language with instructions to retrieve information associated with a user from a social networking system. The client device processes the annotations and sends a request for social information related to the user to a social networking system, subject perhaps to privacy settings in the social networking system. The user's browser uses the information obtained from the social networking system in response to the request to render the markup language document for display on the user's computer system. This process allows the external website to use information from the social networking system to enhance the user's experience on the external website.

20 Claims, 6 Drawing Sheets

(56) References Cited

U.S. PATENT DOCUMENTS

| | | | |
|---|---|---|---|
| 6,223,177 B1 | 4/2001 | Tatham et al. | |
| 6,519,629 B2 | 2/2003 | Harvey et al. | |
| 6,608,636 B1 | 8/2003 | Roseman | |
| 6,750,881 B1 | 6/2004 | Appelman | |
| 7,032,006 B2 | 4/2006 | Zhuk | |
| 8,250,145 B2 * | 8/2012 | Zuckerberg | G06Q 30/02 705/80 |
| 8,732,846 B2 * | 5/2014 | D'Angelo | G06F 21/6245 726/27 |
| 2005/0216300 A1 * | 9/2005 | Appelman | G06Q 10/10 705/319 |
| 2008/0126318 A1 | 5/2008 | Frankovitz | |
| 2009/0144392 A1 | 6/2009 | Wang et al. | |
| 2010/0242121 A1 | 9/2010 | Johnson et al. | |
| 2011/0264736 A1 * | 10/2011 | Zuckerberg | G06Q 30/02 709/204 |

OTHER PUBLICATIONS

Sarin, S., et al., "Software for Interactive On-Line Conferences," Conference on Supporting Group Work, Proceedings of the Second ACM-SIGOA Conference on Office Information Systems, 1984, pp. 46-58.
United States Office Action, U.S. Appl. No. 12/508,521, dated Aug. 8, 2012, sixteen pages.
United States Office Action, U.S. Appl. No. 12/508,521, dated Feb. 22, 2013, nineteen pages.

\* cited by examiner

MARKUP LANGUAGE FOR INCORPORATING SOCIAL NETWORKING SYSTEM INFORMATION BY AN EXTERNAL WEBSITE

FIELD OF THE INVENTION

This invention relates to social networking systems and in particular to using information from a social networking system in interactions with an external website outside of the social networking system.

BACKGROUND

A system, such as a website interacts with a client device by sending information to the client device in response to requests from the client device. The information sent to the client device may be in the form of a markup language document, for example, a hypertext markup language (HTML) document. A markup language document can include instructions to be executed by the client device, for example, instructions to render content provided in the markup language document. A system that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access to particular information on the system, also provide information that can be stored in the user's record. The system may then use information provided by the user and information gathered about the user, to constantly customize interactions of the system with the user. For example, a website selling books may keep track of a user's previous purchases and provide the user with information on related books during subsequent interactions with the system. Information in a user's profile may also be used by the system to target advertisements that are of interest to the user. Using information collected from and about users results in a system that is more efficient and beneficial for both the user and the system.

However, prior systems, including websites, lack the ability to use information associated with a user's social connections or activities to customize and/or personalize the user's experience while using the system. Access to information about the user's social interactions and/or the activities of a user's social connections (e.g. friends, family, co-workers, etc.) improves the user's experience while using the system and increases the chance that the user will use the system in the future. For example, users visiting a website that sells books may be interested in books that their social connections have looked at, book reviews or comments provided by their social connections, and other social information that might inform their purchases of book from the website. The system itself also benefits, because it can leverage information about the user and the user's social connections to more accurately determine what a user might be interested in. Such a system can use social information to customize a user's experience and target products, services and/or advertisements to the user.

Typical systems do not possess sufficient information about a user's social connections to customize the user's experience or effectively target advertising to the user. Assembling enough information about a user's social connections for these purposes requires a system to interact with a large number of users over an extended period of time. The majority of websites will not have the resources, expertise, or user base required to build and maintain a system of the scale necessary to capture, organize and maintain a sufficient amount of information about users' social connections and their activities. Thus, users of these systems will have an inferior experience, and the customization/personalization provided by these sites is unlikely to accurately take into account or reflect information about the user's social connections and their activities.

SUMMARY

A social networking system maintains information related to social aspects of its users. This information may be highly valuable to external websites and other systems that do not maintain this information. Embodiments of the invention allow external websites to use information about users of a social networking system and their connections. The external website may use this information for various purposes, for example, to present information related to a user's connections while the user is navigating the external website, or to use a user's information to determine what information (such as advertisements) the external website should present to the user.

Instructions to access a social networking system are provided to a client device in a markup language document sent to the client device by an external system. The markup language document executes the instructions to access the social networking system and obtain social networking information from the social networking system. The markup language document also includes instructions for rendering a webpage on the client device. The client device uses the social networking information for rendering the web page.

In one embodiment the external website presents to the user's client device a markup language document containing instructions for fetching information from a social networking system website. The processing of the instructions in the markup language document by the client device causes a request for information associated with the user to be sent to a social networking system. The requested information is received from the social networking system server. A displayable web page that includes information from the social networking system is then rendered based on the markup language, and the rendered web page is displayed on the user's computer system.

In some embodiments, the request for information provides information identifying the user to the social networking system allowing the social networking system to identify the correct user. The information requested from the social networking system may be associated with the user or with the user's connections. The social networking system ensures that the privacy settings of all the users whose information is being requested are respected. A subset of the requested information based on the privacy settings of all the users whose information is requested is provided to the client device. The markup language document is processed by the client device based on the social networking system information obtained and rendered for display at the client device.

The features and advantages described in this summary and the following detailed description are not all-inclusive.

Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Interactions Between an External Website and a Social Networking System

A social networking system offers its users the ability to communicate and interact with other users of the social networking system. In use, users join the social networking system and then add connections to a number of other users to whom they desire to be connected. As used herein, the term "connection" refers to any other user to whom a user has formed a connection, association, or relationship via the website (connections are sometimes referred to herein by using the term "friend"). A "user" can be an individual or any other entity represented in a social networking system. Connections may be added explicitly by a user, for example, the user selecting a particular other user to connect to, or automatically created by the social networking system based on common characteristics of the users (e.g., users who are alumni of the same educational institution). Connections in social networking systems may be in both directions, but need not be. The connection between users may be a direct connection; however, some embodiments of a social networking system allow the connection to be indirect via one or more levels of connections. The functionality of a social networking system may be implemented by a social networking system, for example, with a social networking website.

External websites that require information available in a social networking system may be able to access information from the social networking system using application programming interface provided by the social networking system as described in U.S. application Ser. No. 12/324,761, filed on Nov. 26, 2008, which is incorporated herein by reference in its entirety. Use of application programming interface requires the external website to directly access the social networking system. Alternatively, the external website can present information from the social networking system in the web page by providing instructions to the client device, enabling the client device to retrieve the required information from the social networking system. This mechanism allows the external website to present social networking information in web pages without communicating directly with the social networking system.

Figure 1:
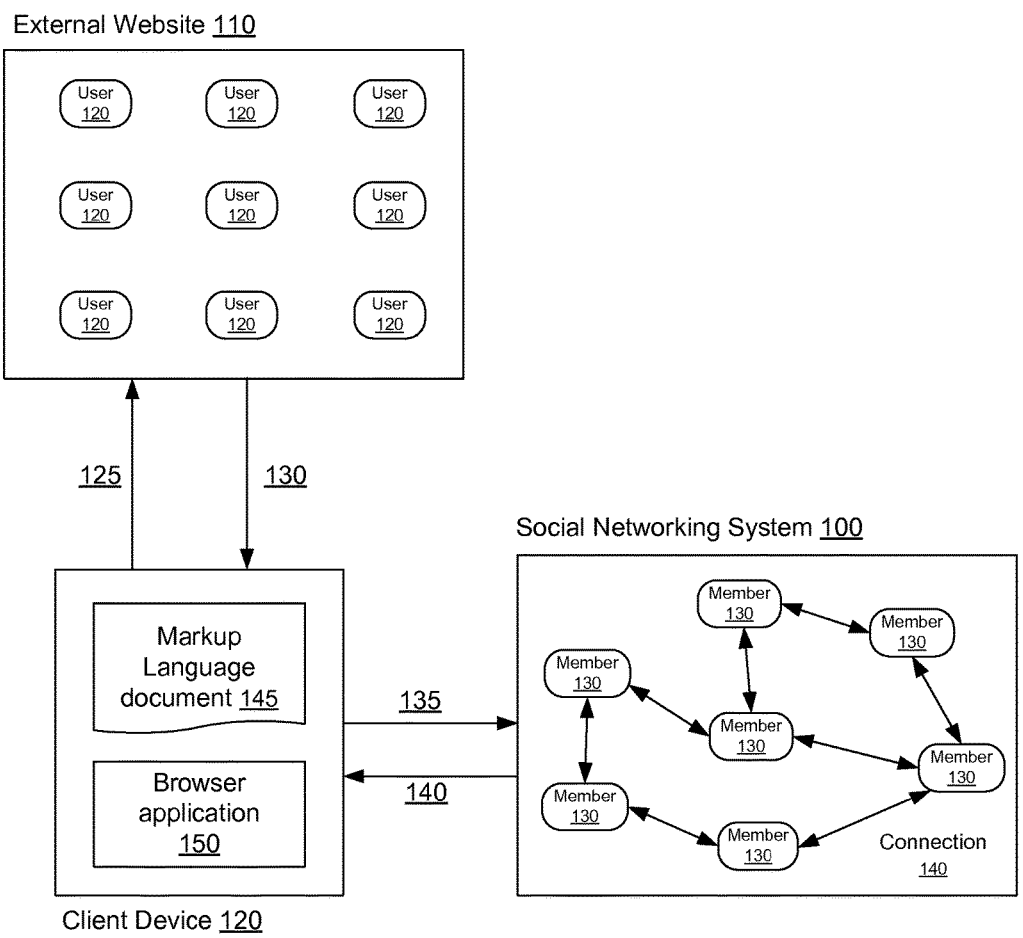
FIG. 1 is high-level diagram illustrating how a markup language document obtained from an external website can provide instructions for interacting with a social networking system, in accordance with one embodiment of the invention.

FIG. 1 shows the interaction between an external website 110 and a social networking system 100, as well as with individuals who may be users 130 of the social networking system 100 and/or users 120 of the external website 110. A user interacts with the external website 110 and/or the social networking system 100 using a client device 120. The external website 110 may have several users 120 that interact with the system. In particular, a person may be a user 130 of the social networking system 100 and also a user 120 of the external website 110. The social networking system 100 keeps a record of information for each user 130 and the connections 140 among the users 130. The record of users 130 and their connections 140 in the social networking system 100 may be called a "social graph."

In response to a request 125 from client device 120, the external website responds 130 with a markup language document 145. A browser application 150 renders the markup language document 150 to display it. The markup language document contains instructions, for example, to specify how content is rendered for display or how additional information can be fetched. In some embodiments, the instructions may be in the form of custom tags interpreted by the client device 120. Alternatively, the instructions may contain program logic interpreted by a scripting engine on the client device 120. The markup language document 145 may include instructions for fetching information from the social networking system 100. An instruction for fetching information from the social networking system 100 is interpreted by the browser application by sending a request 135 to the social networking system 100. The social networking system may respond 140 with the requested information or with a subset of the requested information. The browser application 150 renders a web page based on information obtained from the social networking system 100 along with content obtained from the external website 110 and displays the web page. In one embodiment, the social networking system can be any system that maintains identities of users and provides data associated with the user.

In one embodiment, the information retrieved from the social networking website comprises information available on the user's profile stored on the social networking system. For example, a profile image of the user may be retrieved and displayed on the client device on a web page of the external website. Alternatively, information posted by the member on the social networking system, for example, the status of the user as indicated on the social networking website can be obtained and displayed on the client device on a web page of the external website. The information retrieved from the social networking system can comprise information related to connections of the user on the social networking system. For example, the information retrieved may include a list of friends or a list of friends of friends of the user. Alternatively, the information retrieved may be a flag indicating whether another user is a friend of the user or not.

System Architecture

Figure 2:
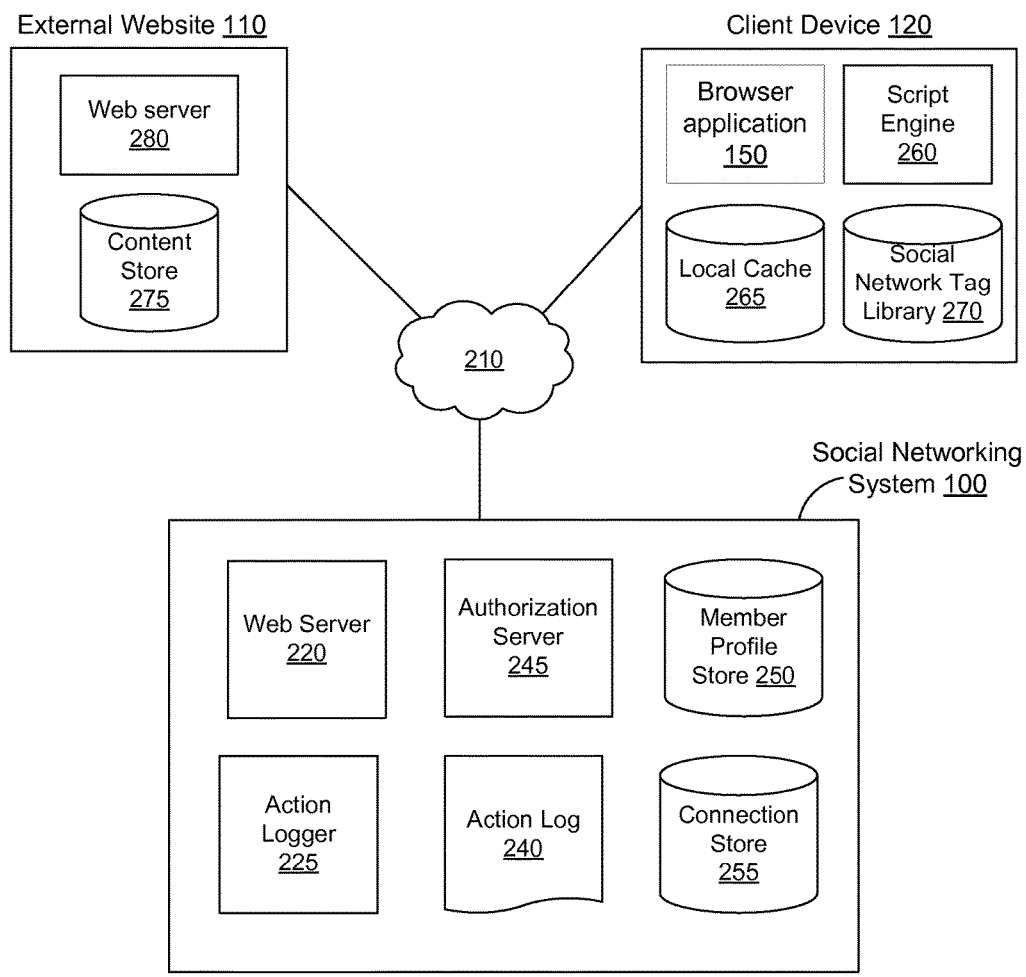
FIG. 2 is a system architecture diagram illustrating a social networking system, a client device and an external website in accordance with an embodiment of the invention.

FIG. 2 is a high level block diagram illustrating a system environment suitable for implementing an embodiment of the invention. The system environment comprises one or more client devices 120, one or more external websites 110, a social networking system 100, and a network 210. In alternative configurations, different and/or additional modules can be included in the system.

FIG. 2 contains a block diagram of the social networking system 100. The social networking system 100 includes a web server 220, an action logger 225, an action log 240, a user profile store 250, and a connection store 255, and an authorization server 245. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 comprises a computing system that allows users to communicate or otherwise interact with each other and access content as described herein. The social networking system 100 stores user profiles in the user profile store 250 that describe the users of a social networking system, including biographic, demographic, and other types of descriptive information, such as work experience, educational history, hobbies or preferences, location, and the like. The social networking system 100 further stores data describing one or more connections between different users in the connection store 255. The connection information may indicate users who have similar or common work experience, group memberships, hobbies, or educational history. Additionally, the social networking system 100 includes user-defined connections between different users, allowing users to specify their relationships with other users. For example, these user defined connections allows users to generate relationships with other users that parallel the users' real-life relationships, such as friends, co-workers, partners, and so forth. Users may select from predefined types of connections, or define their own connection types as needed.

The web server 220 links the social networking system 100 via the network 120 to one or more client devices 120; the web server 220 serves web pages, as well as other web-related content, such as Java, Flash, XML, and so forth. The web server 220 may include a mail server or other messaging functionality for receiving and routing messages between the social networking system 100 and the client devices 120. The messages can be instant messages, queued messages (e.g., email), text and SMS messages, or any other suitable messaging technique.

The action logger 225 is capable of receiving communications from the web server 220 about user actions on and/or off the social networking system 100. The action logger 225 populates the action log 240 with information about user actions to track them. Any action that a particular user takes with respect to another user is associated with each user's profile, through information maintained in a database or other data repository, such as the action log 240. The actions taken by the members that are recorded in the action log may be actions taken on the social networking system 100 or actions taken on the external website 110. The actions taken by the member on an external website 110 are communicated to the web server 220 and the web server 220 sends a request to the action logger 225 to record the actions in the action log 240. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well. When a user takes an action on the social networking system 100, the action is recorded in an action log 240. In one embodiment, the social networking system 100 maintains the action log 240 as a database of entries. When an action is taken on the social networking system 100, the social networking system 100 adds an entry for that action to the log 240.

The authorization server 245 enforces the privacy settings of the users of the social networking system. The privacy setting of a user determines how particular information associated with a user can be shared. The privacy setting comprises the specification of particular information associated with a user and the specification of the entity or entities with whom the information can be shared. The entities with which information can be shared may include other users, applications, external websites, or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, the information to be shared may be specific information, such as, work phone number, or a set of related information, such as, personal information including several pieces of related information including profile photo, home phone number, and status. Alternatively, the privacy setting may apply to all the information associated with the user. The specification of the set of entities that can access particular information can also be specified at various levels of granularity. Sets of entities with which information can be shared may include, for example, all friends of the user, all friends of friends, all applications, or all external systems. One embodiment allows the specification to comprise an enumeration of entities, for example, the user may provide a list of external systems that are allowed to access certain information. Another embodiment allows the specification to comprise a set of entities along with exceptions that are not allowed to access the information. For example, a user of a social networking system may allow all external systems to access the user's work information but specify a list of external systems that are not allowed to access the work information. Certain embodiments call the list of exceptions that are not allowed to access certain information a "block list." External systems belonging to a block list specified by a user of a social networking system are blocked from accessing the information specified in the privacy setting. Note that various combinations of granularity of specification of information and granularity of specification of entities with which information may be shared are possible, i.e., all personal information may be shared with friends, whereas all work information may be shared with friends of friends.

Figure 3:
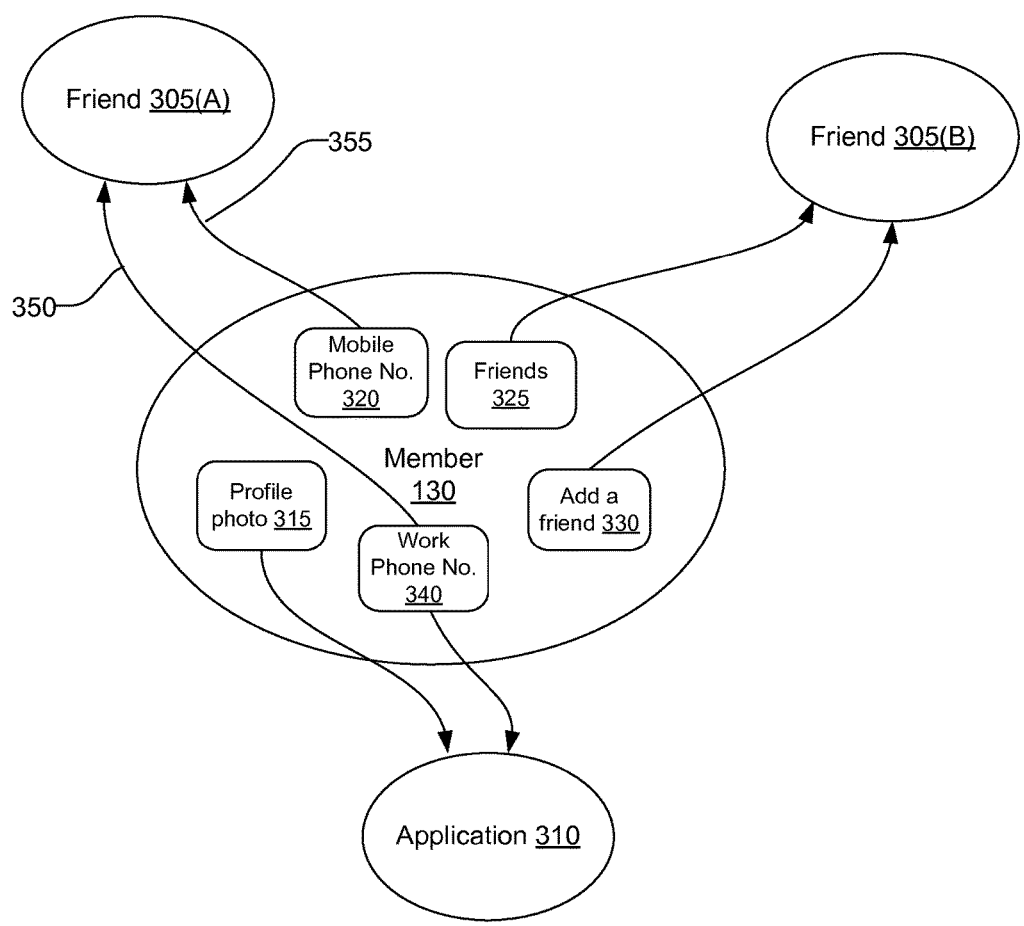
FIG. 3 is an example diagram of privacy settings for a user of a social networking system, in accordance with one embodiment of the invention.

FIG. 3 illustrates an example of how the privacy settings of a user 130 control the accessibility of information associated with the user 130 to the user's friends 305 or applications 310. As shown in FIG. 3, the arrow 350 indicates that friend 305(A) is allowed to access the work phone number 340 of user 130, and arrow 355 indicates that friend 305(A) is allowed to access the mobile phone number of the user 130. Friend 305(A) does not have access to information such as profile photo 315 of the user 130 or the user's friends list 325. On the other hand, friend 305(B) is allowed to access the friends list 325. The information associated with a user includes actions taken by a user such as the action of adding a new friend 330. The user 130 can completely block another user or an application from accessing any information associated with the user 130. A user or an application that is blocked by the user 130 does not have access to any information associated with user 130.

The authorization server 245 contains logic to determine if certain information associated with a user can be accessed by a user's friends and/or other applications and entities. For example, an application 310 that attempts to access a user's work phone number 340 must get authorization to access the information from the authorization server 245. The authorization server 245 decides based on the user's privacy settings if the user's work phone number 340 can be accessed by the application 310. Based on the user's privacy settings, the authorization server 245 decides if the application 310 is allowed to access information associated with the user 130.

As discussed above, the social networking system 100 maintains data about objects with which a user may interact on the social networking system 100. To this end, the user profile store 250 and the connection store 255 store instances of the corresponding type of objects maintained by the social networking system 100. Each object type has information fields that are suitable for storing information appropriate to the type of object. For example, the user profile store 250 contains data structures with fields suitable for describing a user's profile. When a new object of a particular type is created, the social networking system 100 initializes a new data structure of the corresponding type, assigns a unique object identifier to it, and begins to add data to the object as needed. This might occur, for example, when a user becomes a user of the social networking system, the social networking system 100 generates a new instance of a user profile in the user profile store 250, assigns a unique identifier to the user profile, and begins to populate the fields of the user profile with information provided by the user.

FIG. 2 also contains a block diagram of the external website 110. The external website includes components web server 280 and a content store 275. In alternative configurations, different and/or additional modules can be included in the external website. The web server 280 is similar in functionality to the web server 220 described above and links the external website 110 via the network 120 to one or more client devices 120. The web server 280 in some embodiments generates markup language documents in response to requests from the client device 120. In other embodiments, the web server may retrieve previously generated markup language documents and return them in response to requests from the client device 120. The content store 275 contains information specific to the external website 275 that users of client devices 120 may be interested in. For example, an external website of an online bookstore may store information related to books in the content store 275. Content from the content store 275 may be included in the markup language documents returned by external website in response to requests from the client device 120.

The client devices 120 comprise one or more computing devices that can receive user input and can transmit and receive data via the network 120. For example, the client devices 120 may be desktop computers, laptop computers, smart phones, personal digital assistants (PDAs), or any other device including computing functionality and data communication capabilities. The client devices 120 are configured to communicate via network 120, which may comprise any combination of local area and/or wide area networks, using both wired and wireless communication systems.

The client device 120 includes components browser application 150, script engine 260, local cache 265, and social networking system tag library 270. In alternative configurations, different and/or additional modules can be included in the client device 120. In some embodiments, the browser application may be an internet browser that allows users to browse websites on the internet. In other embodiments, the browser application may be an application program that runs in the internet browser. The browser application 150 provides a user interface for the user to interact with the external website 110. In some embodiments, the browser application 150 is capable of sending requests to a website or server and receiving the response from the website or server. In some embodiments, the browser application 150 is capable of displaying text and graphics and allowing the user to input commands that may cause requests to be sent to websites. The browser application 150 may store data or information in local cache 265. The browser application 150 renders markup language documents received from the external website 110 for displaying. The browser application 150 may use the scripting engine 260 to interpret the markup language document if the markup language document contains program logic for the script engine 260. An example of a language used for providing instructions in a markup language document that can be executed by the script engine 260 is JAVASCRIPT. The interpretation of the instructions in the markup language document may require the browser application to interact with other websites or servers, for example, the external website 110 or the social networking system 100. In some embodiments, the markup language document contains custom tags for performing specialized tasks not typically provided by the markup language. The interpretation of custom tags requires a custom tag library that provides the program logic that corresponds to each custom tag. An example of a custom tag library is the social networking system tag library 270 that provides interpretation of specialized tags that allow specific information to be retrieved from the social networking system 100.

An example of a custom tag that may be provided for retrieving the profile picture of a user from the social networking system is <profile-picture userid="1234" width="32" height="32"/>. The name of the custom tag is "profile-picture" and the attributes provided as input are the userid corresponding to the identification of the user and the expected width and height of the image. The browser application 150 interprets the tag profile-picture by loading the program logic for the custom tag from the social networking system tag library 270 and using the script engine 260 to interpret the program logic. For example, to interpret the profile-picture tag, the browser application 150 may send a request to the social networking system 100 with the userid, width, and height parameters. The social networking system 100 may respond with a profile picture of the specified dimensions of the corresponding user.

Figure 4:
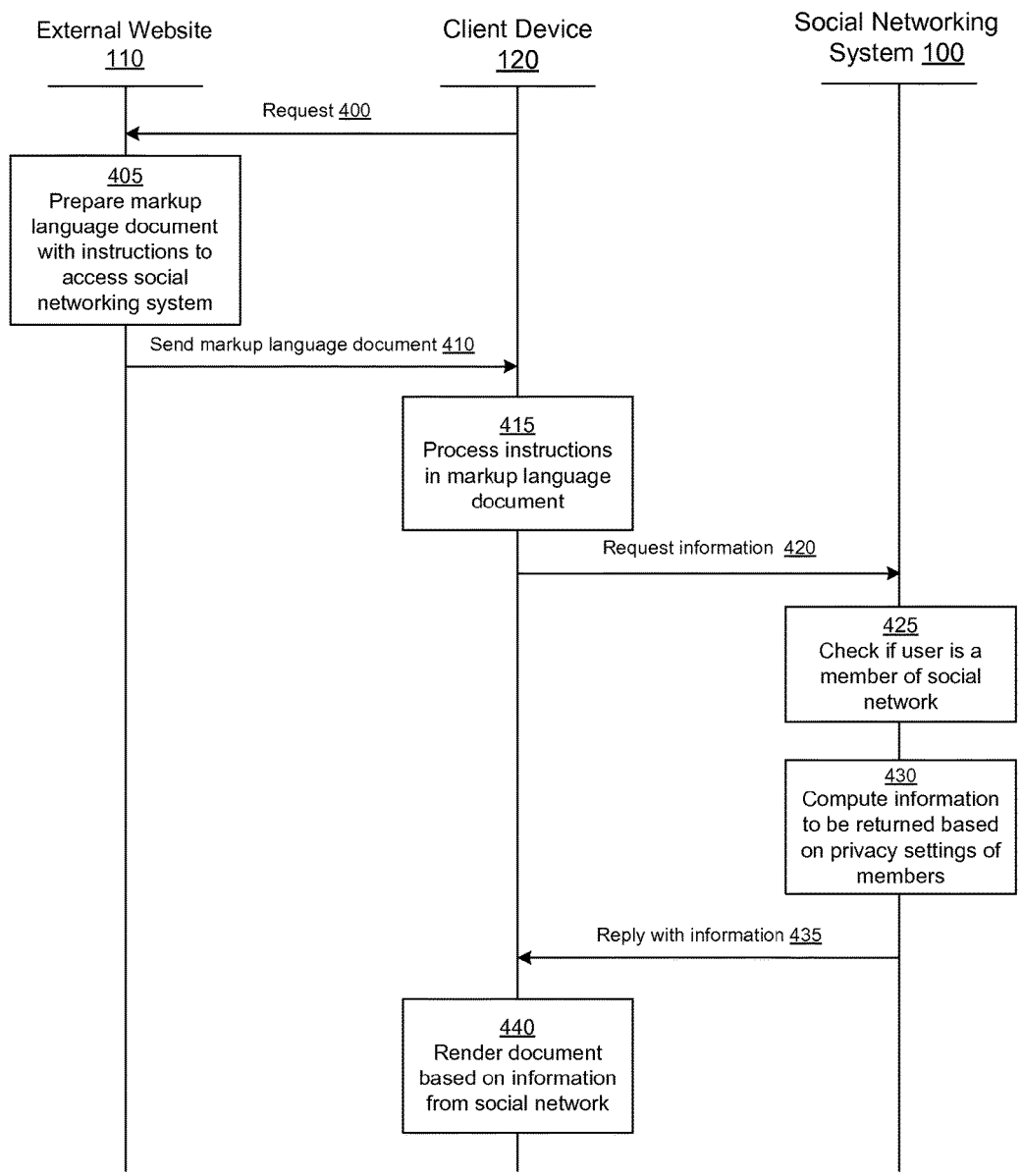
FIG. 4 is an interaction diagram of a process in which the client device processes a markup language document obtained from an external website by obtaining information from a social networking system, in accordance with one embodiment of the invention.

FIG. 4 shows an interaction diagram of a process in which the client device 120 processes markup language document obtained from an external website 110. The client device 120 sends a request 400 to the external website 110. The request 400 may be a request for information available at the external website 110. The external website 110 prepares 405 a markup language document in response to the request 400. The external website 110 may either generate the markup language document or retrieve a previously prepared markup language document. The external website 110 sends the markup language document to the client device 120. The client device 120 renders the markup language document for display.

A portion of the markup language document may include all the necessary information required for rendering the portion. For example, the portion may include the content of a paragraph of text and all the information necessary for formatting the paragraph. The browser application 150 can render the portion without requiring any additional interaction with any server/website. Some other portion of the markup language document may require information from the social networking system for rendering the corresponding portion of the document. A portion of the document that requires information from the social networking system 100 includes instructions specifying details of the information required from the social networking system. The client device 120 sends a request 420 to the social networking system 100. In some embodiments, the social networking system 100 checks 425 whether the user for whom information is requested is a user of the social networking system. In other embodiments, the check 425 is performed for an initial request from the client device 120 and a key identifying the user is provided to the client device 120. The client device 120 may store the identification key in the local cache 265 for future use. In subsequent requests, the client device 120 sends the identification key of the user along with the request, thereby simplifying the process of checking 425 if the user is a user of the social networking system.

The social networking system 100 computes 430 the information requested 420 by the client device 120. The information requested may be based on the user profile of the user (including information about the user's actions and interactions on the social networking system and external systems) or based on the user's connections (including the connection's actions and interactions on the social networking system and external systems). The authorization server 245 of the social networking system 100 checks the privacy settings of all users whose information is requested to determine the information that can be returned in response to the request 420. Based on the privacy settings of the users, either the complete set of information requested or a subset of the information requested is sent in a reply 435 to the client device 120. The client device 120 renders 440 the document based on the information received from the social networking system and the information obtained from the external website 110 in the markup language document.

Figure 5:
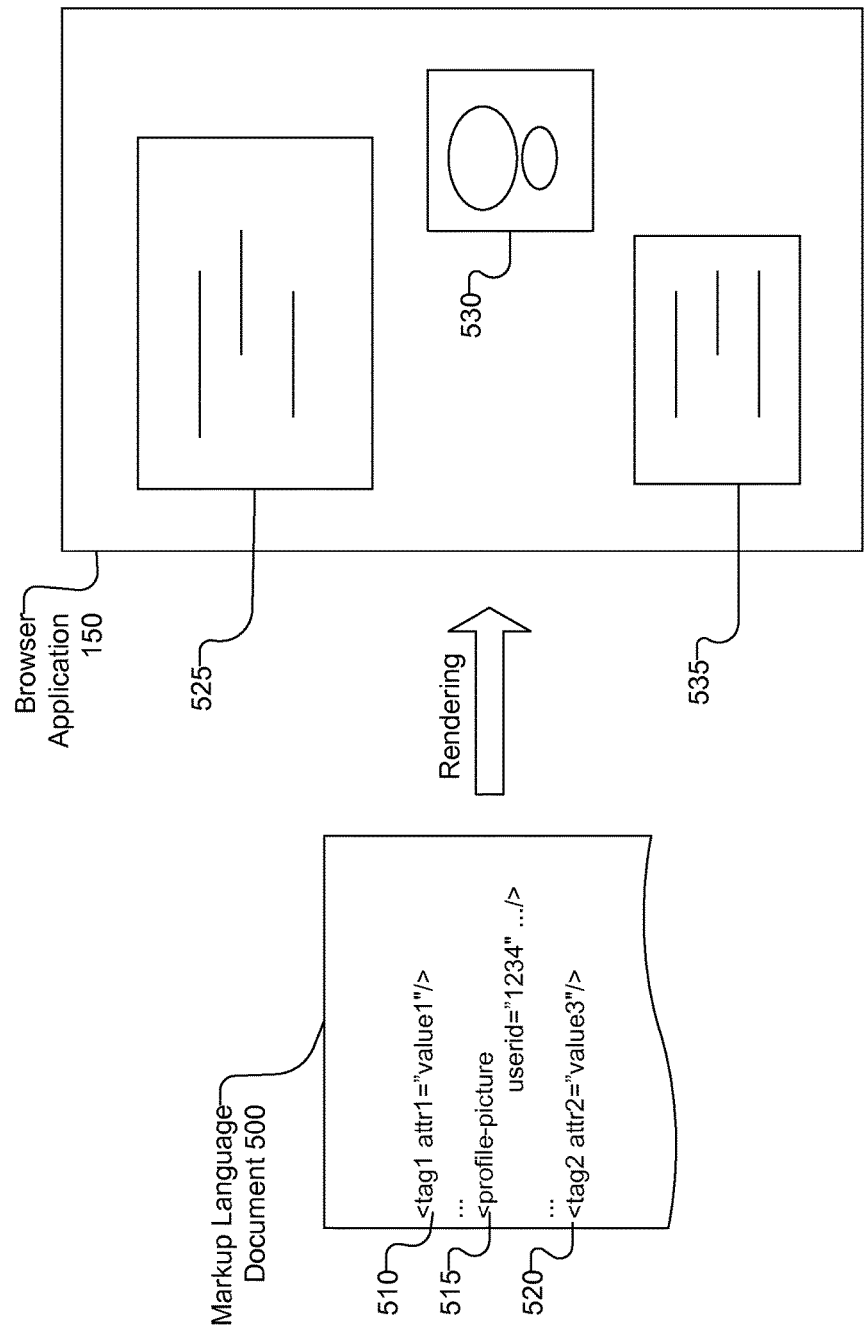
FIG. 5 shows an example markup language document including instructions to render content from an external website along with information retrieved from a social networking system and the rendering of the markup language document on a web browser application, in accordance with an embodiment of the invention.

FIG. 5 shows an example of a markup language document that includes custom tags, illustrating how the markup language document appears when it is displayed. The markup language document 500 contains various tags including 510, 515, and 520. The tags tag1 and tag2 are assumed to be standard tags provided by the markup language. The tag profile-picture is a custom tag that requires social networking system tag library 270 for interpretation. The attributes attr1, attr2, and userid are inputs to various tags and provide parameters useful for rendering the corresponding tags. FIG. 5 also shows an example screenshot of browser application 150 displaying rendered document 500. The portions 525 and 535 of the rendered markup language document are obtained by rendering tags tag1 510 and tag2 520 respectively. The portion 530 of the markup language document 500 corresponding to the tag profile-picture 515 displays an image based on the profile picture of a user obtained from the social networking system 100.

Figure 6:
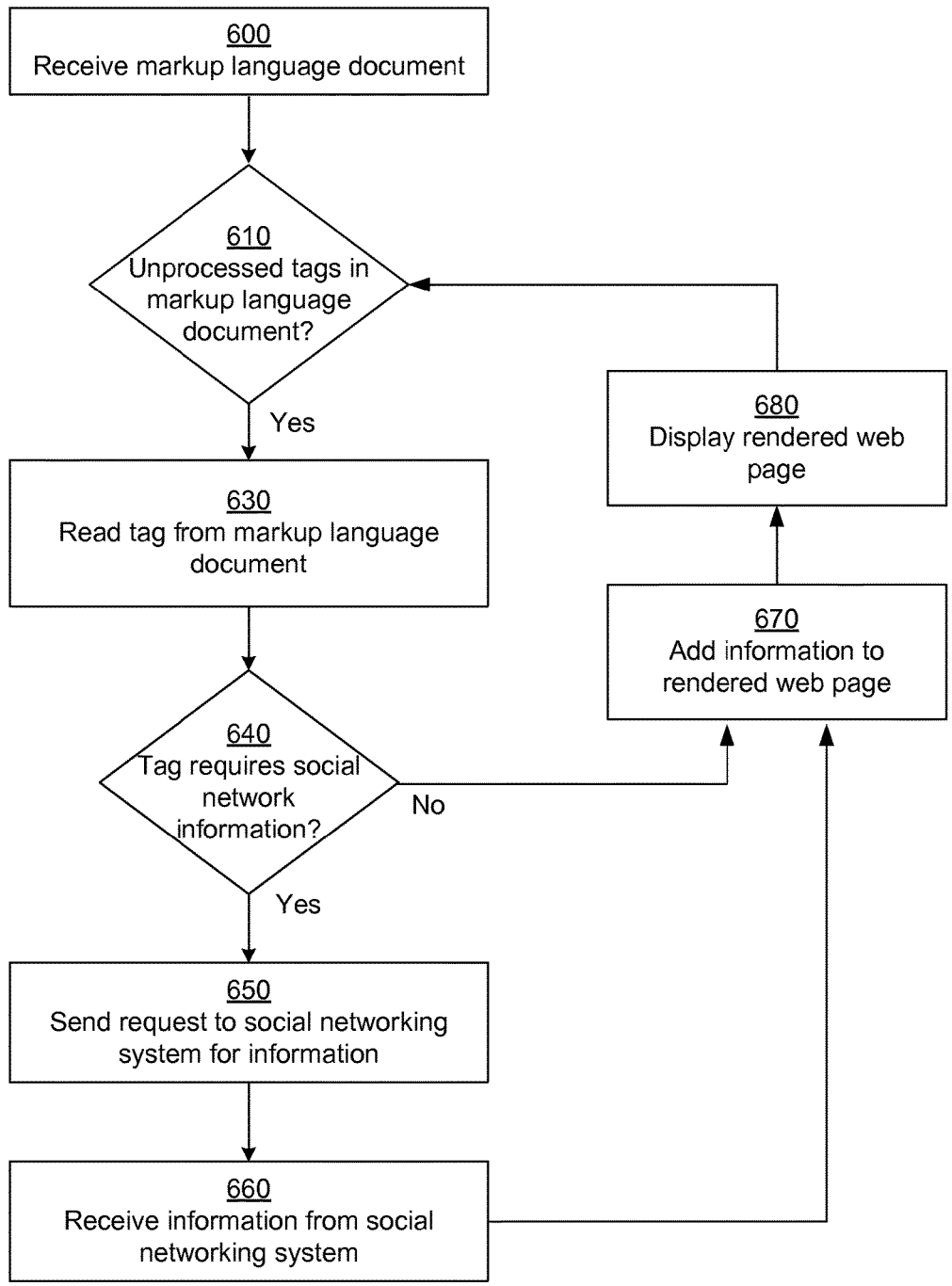
FIG. 6 is a flowchart of a process for rendering a markup language document obtained from an external website to display content from the external website along with information obtained from a social networking system, in accordance with an embodiment of the invention.

FIG. 6 shows a flowchart illustrating the process used for rendering a markup language document obtained from the external website, in accordance with an embodiment of the invention. A markup language document is received 600 in response to a request sent to the external website 110. The markup language document contains tags defined by the markup language as well as custom tags. The tags available in the markup language document are processed one by one and a check 610 performed to verify if there are any unprocessed tags. If there are unprocessed tags in the document, an unprocessed tag is read 630 for processing. A check 640 is performed to determine if the rendering of the tag requires social network information. If the tag can be rendered without social network information, the information available in the tag is added 670 to the rendered page and the corresponding portion of the web page displayed 680. If the check 640 determines that processing the tag requires social network information, a request is sent 650 to the social networking system 100. The information provided by the social networking system 100 is received 660, added 670 to the rendered web page, and displayed 680. The embodiment shown in FIG. 6 displays the web page as it is rendered. Some embodiments may render the entire web page before displaying it.

In some embodiments the scripting engine 260 on the client device 120 optimizes a set of instructions retrieving information from the social networking system in the markup language document. For example, multiple requests to the social networking system 100 that fetch the same information can be replaced with a single request. Alternatively, multiple requests may be batched together to minimize communication overhead between the client device 120 and the social networking system 100 since multiple round trips of messages are replaced by a single round trip of messages.

Some embodiments provide instructions in the markup language document to send a request to the social networking system 100 specifying conditions for filtering the information retrieved. For example, the condition may specify a location such that a list of friends of the user with addresses in the location is retrieved, or specific information is fetched only if the user's address is within the location. Alternatively, the condition may specify a range of age such that a list of friends with age within the specified range is retrieved, or specific information related to the user is fetched only if the user is within the specified age range. In some embodiment, information in the social networking system is associated with predefined attributes with specific values. The request for information from the social networking system specifies a value of an attribute, such that only content from the social networking system associated with the specified value of the attribute is fetched.

In some embodiments, the social networking system 100 renders a complete markup language snippet and returns it in response to the client request. This enables the social networking system 100 to determine the rendering and presentation of the information provided by the social networking system 100. For example, the external website 110 may present a user with a web page displaying content from the external website 110 along with a portion of the web page that resembles information normally displayed on the social networking system. As a result, the external website 110 presents the user with web pages that present information from social networking system 100 in a manner that the user is used to seeing on a social networking website.

In some embodiments, the information requested by the client device comprises access control information. For example, the social networking system may provide value of a flag indicating whether the user has access to specific information related to a connection such as the connection's profile photo. The access control information obtained from the social networking system may be used by the external website 110 to determine if some content from the external website 110 is displayed to the user.

In one embodiment, the social networking system 100 stores information related to external websites. For example, the social networking system 100 can keep track of activities of users of the social networking system on the external website 110, such as purchases made or comments posted on the external website 110. A markup language document provided to the browser application 150 can instruct the browser application 150 to send a message to the social networking system 100 to store information associated with actions taken by users on the external website, for example, purchase of an item. A user must grant permission to an external website to provide information to the social networking system. Information related to such permissions may be part of the privacy settings for a user stored on the social networking system 100. This information can be stored by the action logger 225 in the action log 240. Periodically, all actions (or a subset of actions determined to be significant) taken by a user on the external website are analyzed from the action log 240 and stored in a data structure associated with the profile of the user in the user profile store 250. The external website 110 can provide a markup language document to the client device 120 with instructions to retrieve activities of the user's connections on the external website and present them to the user. This ability is beneficial to the external website since a user is more likely to be interested in an item available on the external website if the user is made aware that a connection of the user demonstrated an interest in the item.

In some embodiments, the instructions provided in the markup language allow the browser application 150 to open a communication channel between the client device 120 and the social networking system 100. The user may be provided with user interface controls on the web page provided by the external website 110 to communicate with the social networking system 100. The communication may allow the user to send/receive information to/from the social networking system 100. For example, the communication channel may be used to post comments on the social networking system allowing the user to post messages related to the external website. The ability to perform such activity from a web page of the external website provides a much better user experience compared to a user starting the communication with the social networking system 100 explicitly, for example, by opening a new internet browser window for this purpose. As a result, the user is more likely to communicate information related to the external website 110.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
receiving, by a client device, a mark-up language document from a website external to a social networking system, the mark-up language document containing one or more custom tags provided by the social networking system for retrieving information associated with a user of the social networking system and for displaying the retrieved information associated with the user based on the mark-up language document;
processing, by the client device, the one or more custom tags contained in the mark-up language document using a custom tag library from the social networking system that provides program logic for each of the one or more custom tags;

responsive to processing the one or more custom tags, sending a request to the social networking system for the information associated with the user;

receiving the requested information associated with the user from the social networking system in response to the request for the information; and generating a displayable web page based on the mark-up language document that displays the requested information received from the social networking system with content of the website.

2. The computer implemented method of claim 1, further comprising:

sending a request to the external system, wherein a response to the request includes information provided by the external system.

3. The computer implemented method of claim 1, wherein the requested information associated with the user received from the social networking system is determined based on one or more privacy settings of the user.

4. The computer implemented method of claim 1, wherein the requested information associated with the user received from the social networking system generated on the displayable webpage is determined based on one or more privacy settings of the user.

5. The computer implemented method of claim 1, wherein the requested information associated with the user received from the social networking system comprises information associated with one or more connections of the user.

6. The computer implemented method of claim 1, wherein the requested information associated with the user received from the social networking system is determined by the social networking system based on access permissions granted by the user to the external system.

7. The computer implemented method of claim 1, wherein the requested information associated with the user received from the social networking system is determined by the social networking system based on access permissions granted by the user to an application processing the page of information received from the external system.

8. The computer implemented method of claim 1, further comprising:

responsive to receiving the requested information associated with the user from the social networking system server, establishing a communication channel with the social networking system for further communication with the social networking system.

9. The computer implemented method of claim 1, wherein the one or more custom tags contain information for retrieving a profile picture of the user from the social networking system, and wherein generating the displayable web page based on the mark-up language document includes providing information for displaying the profile picture of the user on the web page from the website external to the social networking system.

10. The computer implemented method of claim 9, wherein the one or more custom tags for retrieving a profile picture of the user from the social networking system specify a width parameter and a height parameter for displaying the profile picture on the web page.

11. A computer implemented method for providing information associated with a user of a social networking system, the method comprising:

receiving a mark-up language document from an external system external to a social networking system, wherein the mark-up language document comprises:

information items associated with the external system, the information items comprising instructions for generating a display based on the mark-up language document, and instructions for retrieving a profile picture of a user of the social networking system from a social networking system server;

obtaining the profile picture and information for displaying the profile picture of the user of the social networking system based on the mark-up language document from the social networking system server; and generating a displayable web page that comprises the profile picture of the user obtained from the social networking system incorporated with the information items associated with the external system.

12. A non-transitory computer-readable storage medium storing instructions, the instructions when executed causing a processor to perform steps comprising:

receiving, by a client device, a mark-up language document from a website external to a social networking system, the mark-up language document containing one or more custom tags provided by the social networking system for retrieving information associated with a user of the social networking system and for displaying the retrieved information associated with the user based on the mark-up language document;

processing, by the client device, the one or more custom tags contained in the mark-up language document using a custom tag library from the social networking system that provides program logic for each of the one or more custom tags;

responsive to processing the one or more custom tags, sending a request to the social networking system for the information associated with the user;

receiving the requested information associated with the user from the social networking system in response to the request for the information; and generating a displayable web page based on the mark-up language document that contains the requested information received from the social networking system.

13. The non-transitory computer-readable storage medium of claim 12, the instructions causing the processor to perform further steps comprising:

sending a request to the external system, wherein a response to the request includes information provided by the external system.

14. The non-transitory computer-readable storage medium of claim 12, wherein the requested information associated with the user received from the social networking system is determined based on one or more privacy settings of the user.

15. The non-transitory computer-readable storage medium of claim 12, wherein the requested information associated with the user received from the social networking system generated on the displayable webpage is determined based on one or more privacy settings of the user.

16. The non-transitory computer-readable storage medium of claim 12, wherein the requested information associated with the user received from the social networking system is determined by the social networking system based on access permissions granted by the user to an application processing the page of information received from the external system.

17. The non-transitory computer-readable storage medium of claim 12, wherein the requested information associated with the user received from the social networking system comprises at least one of the following:

profile information associated with the user;
an image associated with the user;
a message associated with the user posted on the social networking system; and
access control information associated with the user.

18. The non-transitory computer-readable storage medium of claim 12, wherein the requested information associated with the user received from the social networking system comprises information associated with connections of the user that are associated with the external system.

19. The non-transitory computer-readable storage medium of claim 12, the instructions causing the processor to perform further steps comprising:
responsive to receiving the requested information associated with the user from the social networking system server, establishing a communication channel with the social networking system for further communication with the social networking system.

20. The non-transitory computer-readable storage medium of claim 12, wherein the one or more custom tags contain information for retrieving a profile picture of the user from the social networking system, and wherein generating the displayable web page based on the mark-up language document includes providing information for displaying the profile picture of the user on the web page from the website external to the social networking system.

* * * * *